United States Patent [19]

Sakakibara et al.

[11] Patent Number: 4,927,248

[45] Date of Patent: May 22, 1990

[54] VEHICLE LAMP LENS HAVING FRESNEL LENS

[75] Inventors: Koichi Sakakibara; Yasuo Ozawa, both of Shizuoka, Japan

[73] Assignee: Koito Manufacturing Co., Ltd., Tokyo, Japan

[21] Appl. No.: 334,620

[22] Filed: Apr. 7, 1989

[30] Foreign Application Priority Data

| | | | |
|---|---|---|---|
| Apr. 8, 1988 | [JP] | Japan | 63-46856 |
| Apr. 11, 1988 | [JP] | Japan | 63-89645 |
| Apr. 13, 1988 | [JP] | Japan | 63-89128 |
| Sep. 7, 1988 | [JP] | Japan | 63-223968 |

[51] Int. Cl.⁵ .......... G02B 3/08

[52] U.S. Cl. .......... 350/452

[58] Field of Search .......... 350/452

[56] References Cited

U.S. PATENT DOCUMENTS

| | | | |
|---|---|---|---|
| 1,944,154 | 1/1934 | Dickson | 350/452 |
| 2,762,912 | 9/1956 | Onksen et al. . | |
| 3,204,093 | 8/1965 | Heenan . | |
| 3,883,733 | 5/1975 | Nagel . | |

*Primary Examiner*—Bruce Y. Arnold

*Assistant Examiner*—Rebecca D. Gass

*Attorney, Agent, or Firm*—Sughrue, Mion, Zinn, Macpeak & Seas

[57] ABSTRACT

A lens adapted for use in vehicular lighting employs a Fresnel configuration despite the fact that the lens has no axis of revolution and is formed as a quadric surface to meet vehicle design needs. The basic lens design is obtained by orthographically projecting a planar Fresnel pattern onto the quadric surface. The surfaces of the Fresnel steps are formed so that light emanating from a rear focus is converted into substantially parallel beams by reflection/reflection through the lens. The surfaces may have continuously or incrementally varying angulation, and may be formed by cutting using a 3 or 5 axis milling cutter.

10 Claims, 9 Drawing Sheets

VEHICLE LAMP LENS HAVING FRESNEL LENS

BACKGROUND OF THE INVENTION

The invention relates to a processing technique for forming elliptic or similarly shaped Fresnel steps having a refractive-type and a reflecting-type prism, and relates further to a vehicle lamp lens having a Fresnel lens having such elliptic or similarly shaped Fresnel steps (hereinafter referred to as "an elliptic Fresnel lens").

Conventionally, Fresnel steps having refractive-type and reflecting-type prisms and formed on a lens plate of a Fresnel lens have generally had a front shape defined by a series of concentric circles, as shown in FIG. 9. Lens plates of curved shape have also been known, generally in the form of spherical surfaces. In either the case where the lens plate is a flat plate or a spherical plate having a radius of curvature the axis CL of rotation perpendicular to the surface at the center C coincides with the optical axis L (FIGS. 11(*a*) and 11(*b*)). Thus, lens plates have been limited to shapes consisting of a body of rotation about an axis. With such construction, the light distribution of each Fresnel step can be easily achieved by a two-dimensional design in the radial direction, and processing (working) and molding are easily carried out. In the case when the optical axis L is to be inclined with respect to the plate (dotted lines in FIGS. 11), on the other hand, the rotational axis CL can not be used for the light distribution design, such that a simple two-dimensional design can not be used.

In recent years, moreover, in order to reduce the air resistance of the outer shape of vehicle bodies, there have been increasingly employed lenses for automobile tail lamps and other vehicle lighting which lenses have a narrow rectangular outer shape. Further, there has been a demand for lenses defined by a quadric surface having different radii of curvature in two directions (i.e., having no axis of rotation or revolution). Therefore, conventionally, in molding a rectangular lens member for a vehicle lamp lens, a core 53 for forming a (flat) Fresnel lens portion 50 has been fitted in a mold 52 for forming a lattice-like prism portion 51. For the latter, lattice-like Fresnel steps (angular linearly-transmitting steps) have been used as shown in FIG. 12. However, with such construction, the processing steps are increased, which directly causes increased costs. Thus, this is undesirable from an economical point of view. Furthermore, in vehicle lamp lenses of such type, generally, the molding pattern of the Fresnel lens portion 50 is different from that of the prism portion 51, thus providing a discontinuous pattern. Therefore, the design of the pattern is limited, and the mold has poor cooling characteristics because of the use of the core, which results in more defective moldings.

SUMMARY OF THE INVENTION

The present invention has been made in view of the above problems, and one object of the invention is to provide a technique of engraving three-dimensional Fresnel steps of an elliptical or similar pattern suited for a lens plate having different radii of curvature in two directions, and which may have its optical axis inclined with respect to its surface, and therefore to provide a vehicle lamp lens having such an elliptic or similarly shaped Fresnel lens.

The above object of the present invention has been achieved by a vehicle lamp lens having an elliptic Fresnel lens wherein concentric elliptic pitch baselines are drawn at a suitable pitch on a flat or a curved surface of a lens member; said elliptic pitch baselines are circumferentially divided by a number of radial division lines passing through the center of said elliptic pitch baselines to thereby demarcate a number of elliptically-arcuate Fresnel step design sections; Fresnel steps of an angular shape are formed respectively at said Fresnel step design sections by a cutting operation performed in such a manner that the angle of the angular shape as well as the inclined surfaces of the Fresnel step are so determined that light transmitted from the focus at the reverse side of the lens to the respective Fresnel steps design sections can pass through respective refractive-type prisms or reflecting-type prisms so as to form substantially parallel outgoing beams. The Fresnel steps of angular shape are disposed continuously along said elliptic pitch baselines in juxtaposed relation.

In the above vehicle lamp lens having the elliptic Fresnel lens, the Fresnel steps are arranged in juxtaposed relation along each of the elliptic pitch baselines on a lens surface which is divided into the Fresnel step design sections. Therefore, continuous elliptic Fresnel stripes can be obtained with respect to the front of the lens member, and in the vehicle lamp lens having a Fresnel lens portion and a prism portion, the molded patterns of the two processed portions can be formed into a continuous design of elliptic stripes.

Another object of the invention is to provide a vehicle lamp lens having a Fresnel lens having Fresnel steps formed on a lens surface defined by a quadric surface inclined relative to the optical axis or which has different radii of curvature in the radial and circumferential directions.

The above object of the present invention is met by a vehicle lamp lens having a Fresnel lens wherein concentric pitch baselines are drawn at a suitable pitch on a curved surface of a lens member defined by a quadric surface or the like; said pitch baselines are circumferentially divided by a number of radial division lines passing through the center of said pitch baselines to thereby demarcate a number of arcuate Fresnel step design sections; Fresnel steps of an angular shape are formed respectively at said arcuate Fresnel step design sections by a cutting operating in such a manner that the angle of the angular shape as well as the inclination of the edge or ridge of the angular step in the direction of the pitch baseline is varied so that transmitted light sent from the focus at the reverse side of the lens and passing through respective refractive-type prisms or reflecting-type prisms can form substantially parallel beams, the Fresnel steps being disposed continuously in the circumferential direction of each pitch baseline in juxtaposed relation.

BRIEF DESCRIPTION OF THE DRAWINGS

The principle of the design of the specific Fresnel steps of an Fresnel lenses according to the present invention will now be described with reference to the drawings; in which:

FIG. 7(*b*) is a cross-sectional view of the important portion thereof;

FIG. 8(*b*) is a cross-sectional view of the important portion thereof;

FIG. 11(*b*) is a view of a conventional Fresnel lens comprising a spherical plate;

DESCRIPTION OF THE PREFERRED EMBODIMENTS

Figure 1:
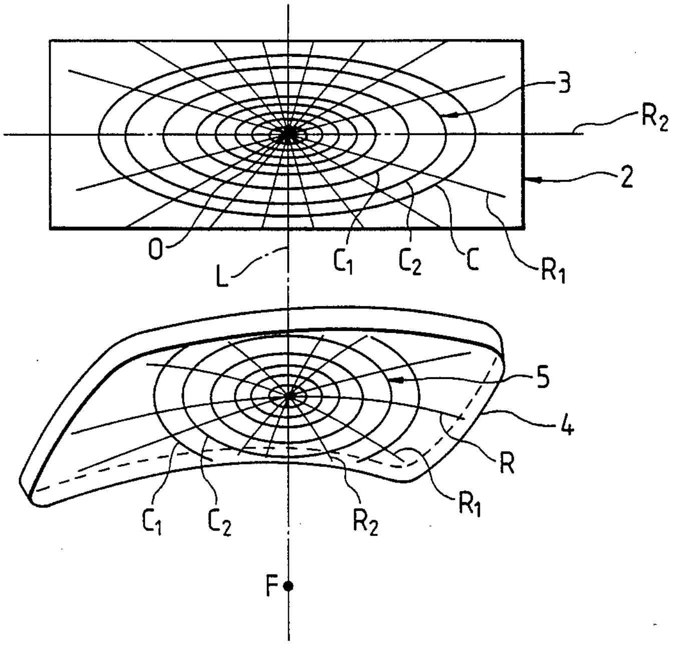
FIGS. 1 and 2 are views explanatory of the principle of a vehicle lamp lens having an elliptic or similarly shaped Fresnel lens provided in accordance with the present invention.

As shown in FIG. 1, a flat pattern plate 2 having a step pattern 3 engraved therein is used for forming a basic Fresnel lens pattern, for example, on a quadric surface. The Fresnel lens pattern of the plate 2 is defined by a body of revolution having an axis of rotation which is perpendicular to the surface and coincides with the optical axis L of the lens. Using this flat pattern plate 2, the step pattern 3 is orthographically projected onto the lens member 4, such as a vehicle lamp lens cover having a quadric surface, in such a manner that the optical axis L remains aligned. The step pattern 3 is here formed of concentric elliptic pitch baselines C1, C2 . . . of a suitable pitch, having a center O lying on the optical axis L of the flat pattern plate 2, and a plurality of evenly spaced radial lines R1, R2. The orthographic projections of these lines on the surface of the lens member 4 are indicated by reference numerals C and R (C1, C2 . . . R1, R2, etc.). In the present invention, Fresnel steps 5 are designed in such a manner that, with respect to a plurality of Fresnel step design sections 1 demarcated by the concentric elliptic pitch baselines C1, C2 . . . and the radial lines R1, R2 . . . passing through the above center O, light rays transmitted from the focus at the reverse side of the lens and passing through respective refractive-type prisms or reflecting-type prisms form substantially parallel beams.

If the lens member 4 is flat, the orthographically-projected pattern on the lens member 4 is the same as the pattern of the flat pattern plate 2 defined by the elliptic pitch baselines and the radial lines. In this invention, however the lens member 4 is typically a quadric (quadratic) surface having different radii of curvature in different directions.

Figure 2:
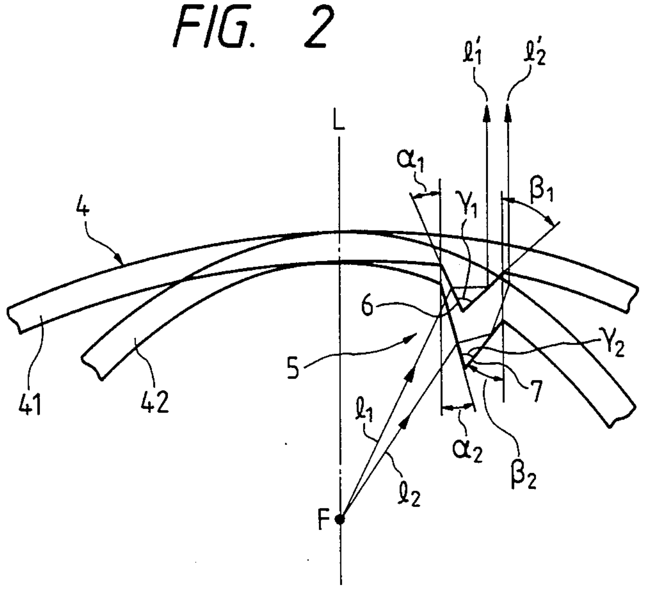

FIG. 2 shows, in an overlapping manner, the cross-sections of radially adjacent sections of the lens at the orthographically-projected lines R1 and R2. Parts in the cross-section through the lens at the line R1 are indicated by the addition of suffix "1" while elements in the cross-section taken along line R2 adjoining line R1 are indicated by suffix "2". The lens member is also indicated by numerals 41 and 42.

Figure 3:
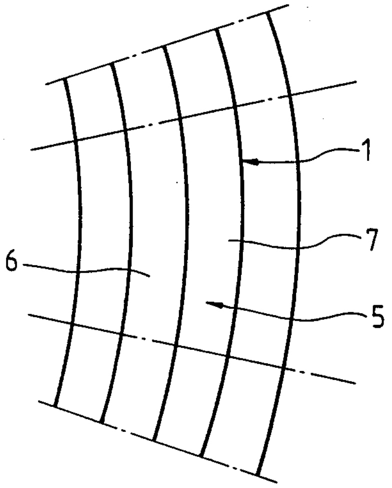
FIG. 3 is an enlarged front-elevational view of a portion of a Fresnel step of a three-dimensional construction according to a first design example.
Figure 4:
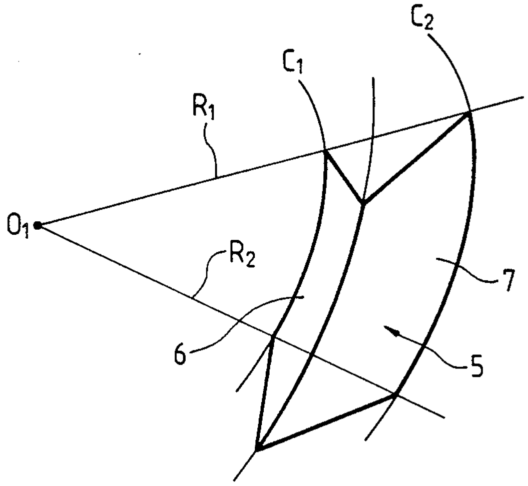
FIG. 4 is an enlarged perspective view of the Fresnel step of FIG. 3.

The circumferentially adjoining Fresnel steps 5 between the concentric elliptic pitch baselines C1 and C2 will now be described with reference to FIGS. 2, 3 and 4, wherein FIG. 4 is a perspective view of the step whose ends are shown in FIG. 3. With respect to each Fresnel step design section 1, the inclination angles $\alpha 1$ and $\alpha 2$ (refractive-type prism angles) of the opposite ends of the inner inclined surface 6 and the inclination angles $\beta 1$ and $\beta 2$ (reflective-type prism angles) of the opposite ends of the outer inclined surface 7 are designed so as to determine vertex or apex angles $\gamma 1$ and $\gamma 2$ at the opposite ends so as to define a respective refractive-type prism and a reflecting-type prism which convert light rays l1 and l2, emanating from the focus F on the optical axis L of the lens member 4 and passing through the opposite ends, into respective outgoing light rays l'1 and l'2, parallel to the optical axis L.

In the design of the Fresnel steps, proper steps can be formed merely by considering the refraction/reflection of the beams at the quadric surface, utilizing the radial cross-sections of e.g. FIG. 2. Therefore, even if the optical axis is inclined relative to the surface of the lens member, concentric Fresnel stripes can be formed on the front face of the lens member with a relatively simple design.

Inclination angles $\alpha 1$, $\alpha 2$, $\beta 1$ and $\beta 2$ are taken with respect to the orthographical projection lines, and therefore the apex angles $\gamma 1$ and $\gamma 2$ are represented by the following formulas:

$$\gamma 1 = \alpha 1 + \beta 1$$

$$\gamma 2 = \alpha 2 + \beta 2$$

Therefore, the inclination angle of the step at any given point is determined in accordance with the gradual variation ($\alpha 1 - \alpha 2$) and ($\beta 1 - \beta 2$) along the step. In accordance with these variations, the angle of a cutter of a milling machine is changed or the position of cutting is gradually changed during the cutting of each Fresnel step design section 1 to form the Fresnel step 5. The Fresnel steps 5 thus formed are arranged continuously in juxtaposed relation along the elliptic pitch baseline C, so that the adjoining steps constitute elliptic Fresnel "stripes" as whole.

Since the vehicle lamp lens having the Fresnel lens according to the present invention has the above construction, the Fresnel steps formed at the Fresnel step design sections are arranged in juxtaposed relation along each elliptic pitch baseline on the surface of the lens member. Therefore, elliptic Fresnel stripes can be obtained with respect to the front of the lens member, and in a vehicle lamp lens having the Fresnel lens portion and a prism portion, the molded patterns of the two processed portions can be formed into a continuous elliptic stripe design.

Further, Fresnel steps of three-dimensional construction can be easily formed or cut in a lens mold element by a milling machine even if the lens member is so curved so as to have different radii of curvature in different directions, and therefore the processing costs of the vehicle lamp lens can be reduced.

Figure 5:
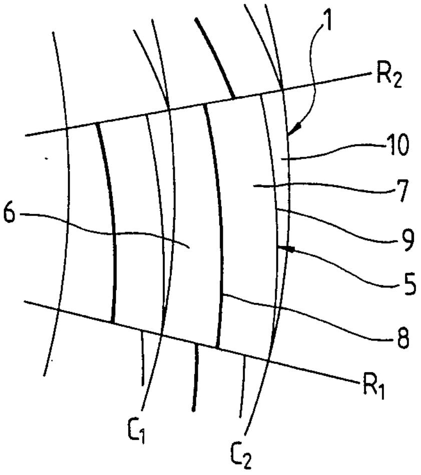
FIG. 5 is an enlarged front-elevational view of a portion of a Fresnel step of another three-dimensional construction.
Figure 6:
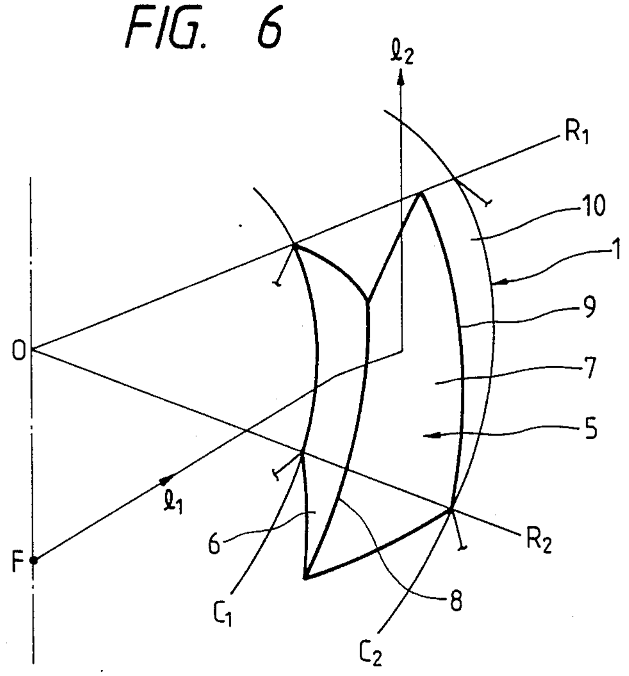
FIG. 6 is an enlarged perspective view of the Fresnel step of FIG. 5.
Figure 13:
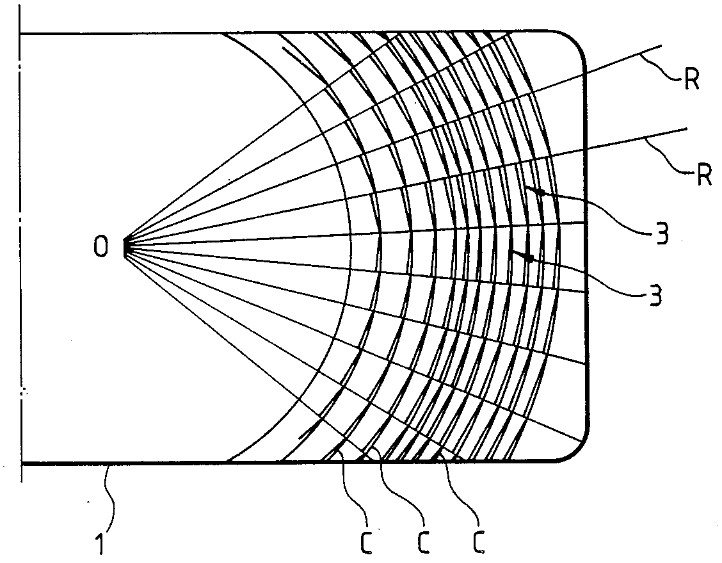
FIG. 13 is a front-elevational view of a portion of a lens member for a vehicle lamp lens having a Fresnel lens provided in accordance with the present invention, showing Fresnel step design sections on a smaller scale than in FIG. 5.

FIGS. 5 and 6 show Fresnel steps 5 of another construction. As before, and as shown in FIG. 13, concentric pitch baselines C are drawn on a lens member 1 which is curved in two directions and has a radius r1 of curvature in one direction and a radius r2 of curvature in the perpendicular direction. The concentric baselines C may be spaced by the same pitch with respect to the center O of the lens. A number of arcuate (circular arch-shaped) Fresnel step design sections 2 are demarcated by the pitch lines C and a number of radial division lines R passing through the center O and dividing the pitch lines C circumferentially.

Figure 7A:
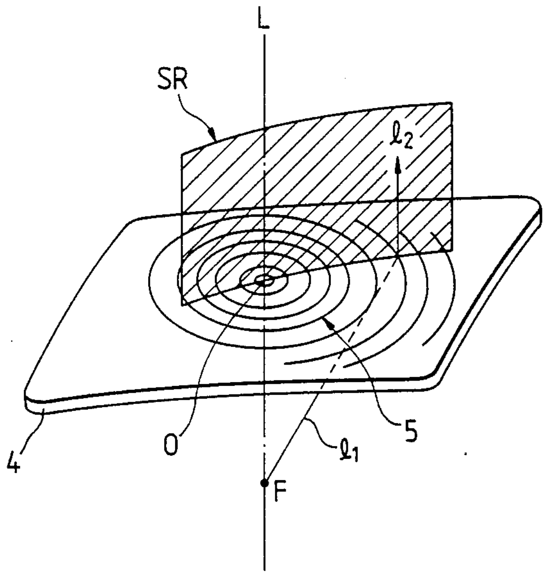
FIG. 7(*a*) is a view explanatory of a Fresnel step of a three-dimensional construction according to the second design example.
Figure 7B:
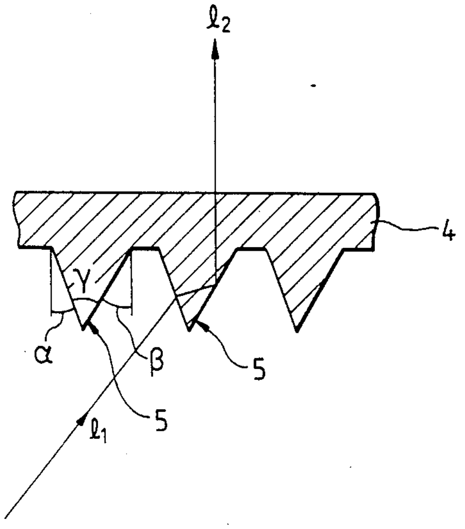

When forming a Fresnel step 5 at each Fresnel step design section 1, first, the inclination angle $\alpha$ of the inner inclined surface 6 and the inclination angle $\beta$ of the outer inclined surface 7 are designed so as to determine the vertex or apex angle 7 of the Fresnel step 5 in such a manner as to define a refractive-type prism and a reflecting-type prism which act to convert a light ray l1, sent from the focus F lying on the optical axis L of the lens member 4 and passing through a central portion of the Fresnel step 5, into an outgoing light ray l2 which is parallel to the optical axis L in a radial cross-section (plane) SR (FIGS. 7(*a*) and 7(*b*)).

Figure 8A:
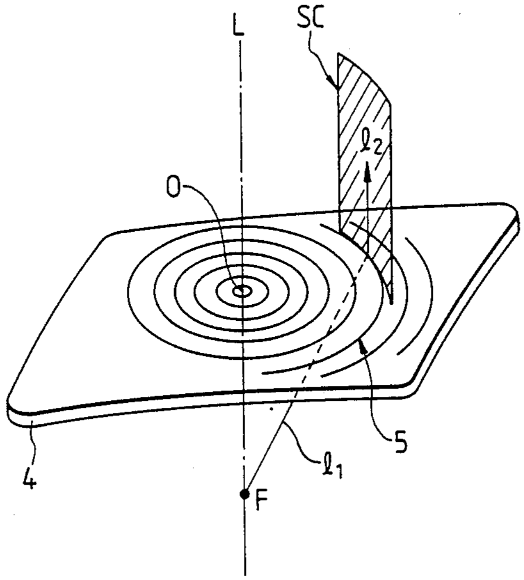
FIG. 8(*a*) is a further view explanatory of a Fresnel step of a three-dimensional construction according to the second design example.
Figure 8B:
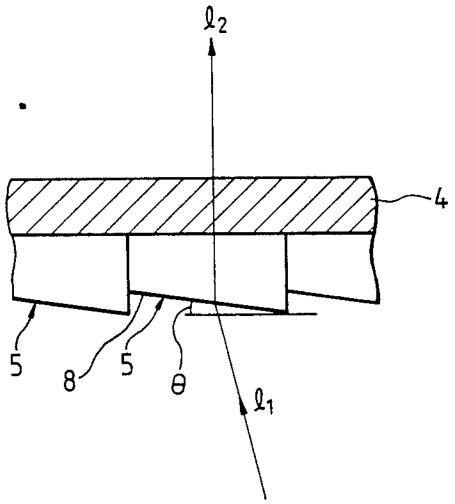
Figure 9:
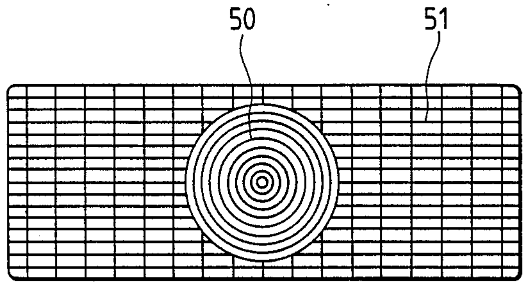
FIG. 9 PRIOR ART
FIG. 9 is a front-elevational view of a known vehicle lamp lens having a Fresnel lens constructed of concentric circles.
Figure 10:
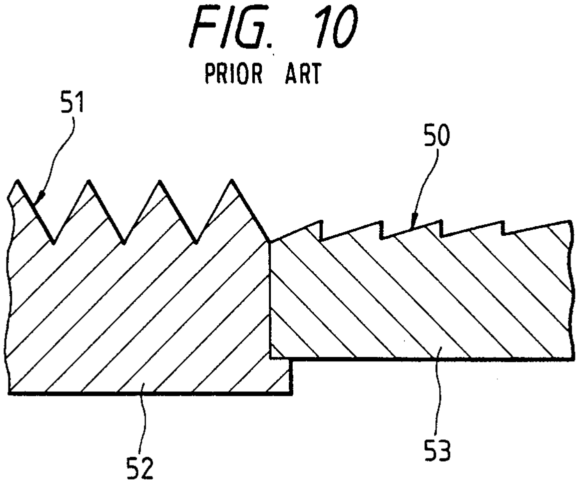
FIG. 10 PRIOR ART
FIG. 10 is a cross-sectional view of portion of a mold used for forming the lens of FIG. 9.
Figure 11A:
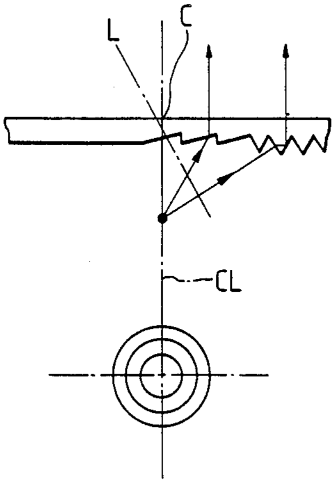
FIG. 11(a) PRIOR ART
FIG. 11(*a*) is a view of a conventional Fresnel lens comprising a flat plate.
Figure 11B:
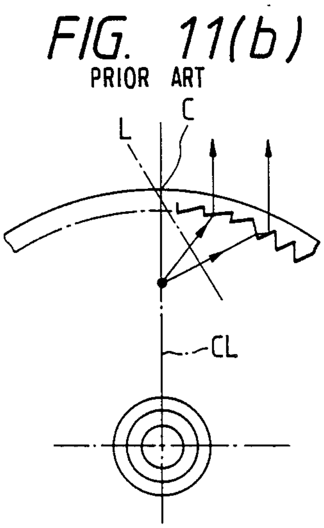
FIG. 11(b) PRIOR ART
Figure 12:
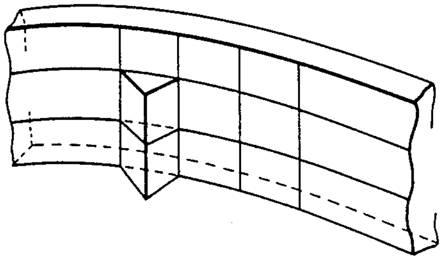
FIG. 12 PRIOR ART
FIG. 12 is a fragmentary perspective view of a conventional construction.

Then, as shown in FIGS. 8(*a*) and 8(*b*), while maintaining this apex angle $\gamma$, the apex ridge or edge 8 is inclined at an inclination angle $\theta$ relative to the lens member 4 such that the transmitted ray l2 is parallel to the optical axis L in a plane SC tangential to the pitch baseline C. The pitch baseline is typically elliptic in this embodiment but is not limited to an elliptical shape.

In this embodiment, a flat lens portion 10 is formed between the outer root line 9 at the root of the outer inclined surface 7 and the pitch baseline C2.

The above inclination angles $\alpha$ and $\beta$ are again taken relative to an orthographic projection line, and therefore the apex angle $\gamma$ is represented by the following formula:

$$\gamma=\alpha+\beta$$

$\alpha$, $\beta$ and $\gamma$ are fixed, and the cutting operation can be performed with a 3-axis milling machine.

The Fresnel steps 5 thus formed are arranged in juxtaposed relation along each pitch baseline C, so that these steps constitute Fresnel stripes as a whole.

In the Fresnel lens constituting the above vehicle lamp lens, the Fresnel steps are formed in the arcuate Fresnel step design sections along each pitch base line C in juxtaposed relation. With this arrangement, the height H of each Fresnel step 3 can be reduced by decreasing the pitch P of the pitch baselines C (P=0.3 to 1.5 mm).

Further, since the Fresnel steps are formed in a locally discontinuous manner, each of the radially and circumferentially-divided Fresnel step design sections on the lens member may be subjected to separate two-dimensional design; that is, in the direction of the passage of the beam across the Fresnel step and in the direction of passage of the beam in the tangential direction, thereby forming a three-dimensional Fresnel step by which the refraction of the beam can be easily controlled.

The manner of construction of the Fresnel steps to be formed in the above Fresnel step design sections will now be described.

Figure 14:
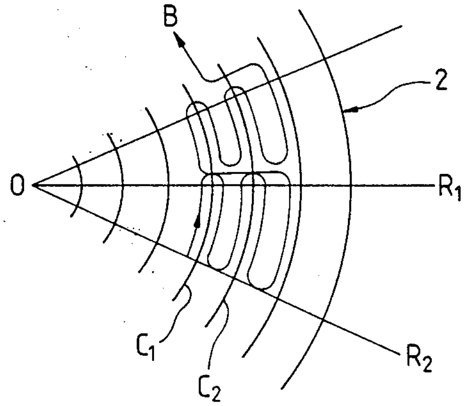
FIG. 14 is a view explanatory of a cutting process carried out by a multiple axis milling machine.

As shown in FIG. 14, the arcuate Fresnel step design sections 2 are sequentially cut by a multiple-axis milling machine (e.g. a 3-axis machine) to form the respective Fresnel steps 3. A cutter B is moved in three dimensions in a "scanning" manner (i.e. with a number of passes separated by a fine radial pitch for each step) in accordance with the design of the Fresnel step 3 to cut the arcuate Fresnel step design section 2, demarcated by the circular division lines C1 and C2 and the radial division lines R1 and R2, to form the Fresnel step 3 in such a manner that the desired inclination angle $\alpha$ of the inner inclined surface 4 and the inclination angle $\beta$ of the outer inclined surface 5 can be obtained. The arcuate Fresnel step design sections 2 are sequentially cut by this scan-cutting operation one after another (i.e., after one section 2 is cut, another adjoining it is cut, generally as indicated in FIG. 14), and Fresnel stripes, substantially continuous in the circumferential direction as a whole, are formed.

Figure 15:
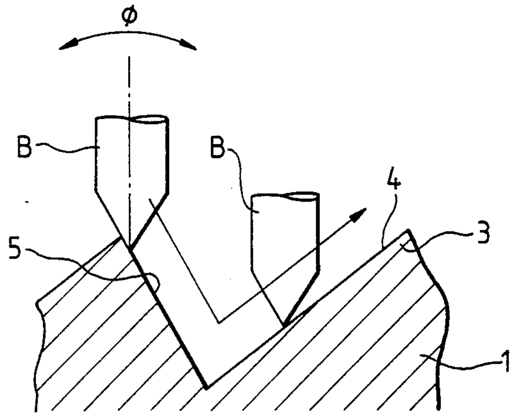
FIG. 15 is a view explanatory of the relation between the Fresnel step and a cutter.

In the case where there is used a multiple-axis milling machine capable of relatively inclining the axis of the cutter B as indicated by an arrow $\phi$ in FIG. 15 (e.g., a 5-axis machine), the Fresnel step 3 can be formed in such a manner that the inclined surface of the cutter B cuts either the contour of inner inclined surface 4 or the outer inclined surface 5 of the Fresnel step 3, and subsequently cuts the adjoining surface, by relatively moving the axis of the cutter B. This method has advantages in that the number of machining passes can be reduced. For a full description of the machining methods usable with the invention the reader is referred to copending Ser. No. 334,621 filed Apr. 28, 1989, (entitled Method of Working Fresnel Step by Yasuo Ozawa et al, filed concurrently with this application) in which these methods are discussed in detail.

Figure 16:
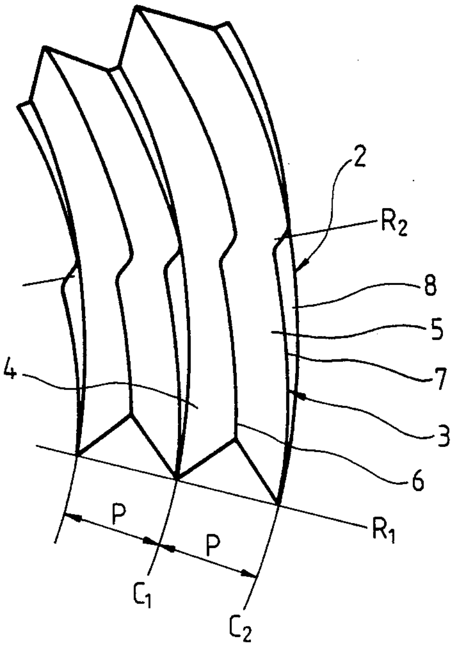
FIG. 16 is a view of an alternative arrangement wherein the somewhat discontinuous steps of FIGS. 5 and 6 are made smoothly continuous and reduced in size to minimize aberrational effects.

In the present design the flat lens areas 10 and the discontinuities at the ends of the steps can cause some undesirable aberrational effects. To counter this problem, the number of the radial division lines R may be increased to the possible upper limit which still enables engraving, to thereby make the arcuate Fresnel design sections 2 fine or very small to such an extent that the flat lens portion 10 if for practical purposes eliminated, and the lines and surfaces of the circumferentially-adjoining Fresnel steps 3 may be made meanderingly continuous with each other, so that the circumferentially-adjoining Fresnel steps 3 are arranged smoothly continuously in a meandering or weaving fashion as shown in FIG. 16.

In manufacturing this three-dimensional Fresnel step, the inclination angle $\alpha$ of the inner inclined surface 4 and the inclination angle $\beta$ of the outer inclined surface 5 of the Fresnel step 3 at each arcuate Fresnel design section 2 are continuously varied from step to step, and therefore the Fresnel steps can be formed most efficiently by controlling the tool of a five-axis milling cutter to move circumferentially and scanningly along the surfaces in accordance with the design values. Thus, cutting of each surface can be performed using one or more (typically more than one) continuous circumferential pass. In the case of plural passes, the tool is radially and depthwise adjusted for each pass (scan). Because of the circumferentially-continuous construction, irregular reflections of the lens can be reduced. Further, since the Fresnel steps are continuous in the circumferential direction, a mold having an excellent moldability can be prepared.

With the vehicle lamp lens having the Fresnel lens of the above construction, the desired light transmission control can be easily obtained by means of the lens design on the quadric surface even with respect to the curved surface of a lens having an inclined optical axis. In addition, the Fresnel steps can be easily formed by a cutting operation employing a multiple-axis milling machine, even a 3-axis machine, and therefore the processing cost can be reduced. Further, when such shape is to be formed by a mold, the cooling ability of such mold is not lowered because of its construction, thereby preventing defective moldings.

What is claimed is:

1. A vehicle lamp lens, comprising: an elliptic Fresnel lens area wherein concentric elliptic pitch baselines are arranged at a suitable pitch on a surface of a lens member; said elliptic pitch baselines being circumferentially divided by a number of radial division lines passing through the center of said elliptic pitch baselines to thereby demarcate a number of elliptically-arcuate Fresnel step design sections; Fresnel steps of an angular shape and having inclined surfaces formed respectively at said Fresnel step design sections; the angle of the angular shape as well as the inclined surfaces of the Fresnel step being determined such that light transmitted from a focus on the reverse side of the lens to the respective Fresnel step design sections will pass through respective prisms so as to form substantially parallel outgoing beams, said Fresnel steps of angular shape being disposed continuously along said elliptic pitch baselines in juxtaposed relation.

2. A vehicle lamp lens having an elliptic Fresnel lens according to claim 1, in which the inclined surfaces of said Fresnel step formed in said Fresnel step design section are gradually varied in angle from one end thereof toward the Fresnel step formed in an adjoining Fresnel step design section in the direction of said elliptic pitch base line.

3. A vehicle lamp lens having an elliptic Fresnel lens according to claim 1, wherein the inclined surfaces of said Fresnel step formed in said Fresnel step design section are circumferentially discontinuous with respect to inclined surfaces of the Fresnel step formed in an adjoining Fresnel step design section in the direction of said elliptic pitch line.

4. A vehicle lamp lens having an elliptic Fresnel lens according to claim 1, wherein the inclined surfaces of said Fresnel step formed in said Fresnel step design section are circumferentially continuously meandering with respect to inclined surfaces of the Fresnel step formed in an adjoining Fresnel step design section in the direction of said elliptic pitch line.

5. A vehicle lamp lens, comprising: a Fresnel lens area wherein concentric pitch baselines are arranged at a suitable pitch on a surface of a lens member; said pitch baselines being circumferentially divided by a number of radial division lines passing through the center of said pitch baselines to thereby demarcate a number of arcuate Fresnel step design sections; Fresnel steps of an angular shape and having inclined surfaces formed respectively at said Fresnel step design sections; the angle of the angular shape as well as the inclined surfaces of the Fresnel step being determined such that light transmitted from a focus on the reverse side of the lens to the respective Fresnel step design sections will pass through respective prisms so as to form substantially parallel outgoing beams, said Fresnel steps of angular shape being disposed along said pitch baselines in juxtaposed relation.

6. A vehicle lamp lens according to claim 5, wherein the inclined surfaces of said Fresnel step formed in said Fresnel step design section together define an apex angle which is constant within each Fresnel step design section, inclined surfaces of adjacent Fresnel steps being circumferentially discontinous with respect to inclined surfaces of the Fresnel step formed in an adjoining Fresnel step design section in the direction of said pitch line.

7. A vehicle lamp lens according to claim 5, wherein the inclined surfaces of said Fresnel step formed in said Fresnel step design section together define an apex angle which is constant within each Fresnel step design section, inclined surfaces of adjacent Fresnel steps being circumferentially meanderingly continous with respect to inclined surfaces of the Fresnel step formed in an adjoining Fresnel step design section in the direction of said pitch line.

8. A vehicle lamp lens having a Fresnel lens according to claim 5, in which a flat lens portion is formed between an outer root line at the root of an outer inclined surface and said pitch baseline, said flat lens portion diverging toward its one end along said pitch baseline.

9. A vehicle lamp lens, comprising: a Fresnel lens pattern formed by the orthogonal projection of a Fresnel pattern defined by a body of revolution having an axis of rotation which is perpendicular to its surface and which coincides with its optical axis, onto a curved surface of a lens member of quadric form, with the optical axis aligned; said pattern comprising Fresnel steps having inclined surfaces disposed respectively at refractive-type prism angle $\alpha 1$ and a reflecting-type prism angle $\beta 1$, said angles of each Fresnel step being gradually changed respectively to a refractive-type prism angle $\alpha 2$ and a reflecting-type prism angle $\beta 2$ of an adjacent Fresnel step in such a manner that light sent from the focus on the reverse side of the lens and passing through the refractive-type prism and the reflecting-type prism form substantially parallel light beams, said angular Fresnel steps being arranged in juxtaposed relation continuously circumferentially along concentric lines.

10. A vehicle lamp lens, comprising: a Fresnel lens area wherein a flat or a curved lens member is divided into a plurality of arcuate Fresnel step design sections by concentric division lines and radial division lines passing through the center of said concentric lines, both division lines being defined on the surface of said lens member; Fresnel steps of an angular shape formed respectively at said arcuate Fresnel step design sections and having a prism surface, the angle of the angular shape as well as the inclination of the edge of the angular step being determined such that light transmitted from the focus of the lens and passing through respective refractive-type prisms or reflecting-type prisms forms substantially parallel outgoing beams, the area of each Fresnel step being minimised by increasing the number of said radial division lines; lines and surfaces at the interfaces of circumferentially-adjoining Fresnel steps being made continuous with each other in a meandering manner.

* * * * *